(No Model.)
H. LATSHAW.
HORSE DETACHER.
No. 397,733. Patented Feb. 12, 1889.
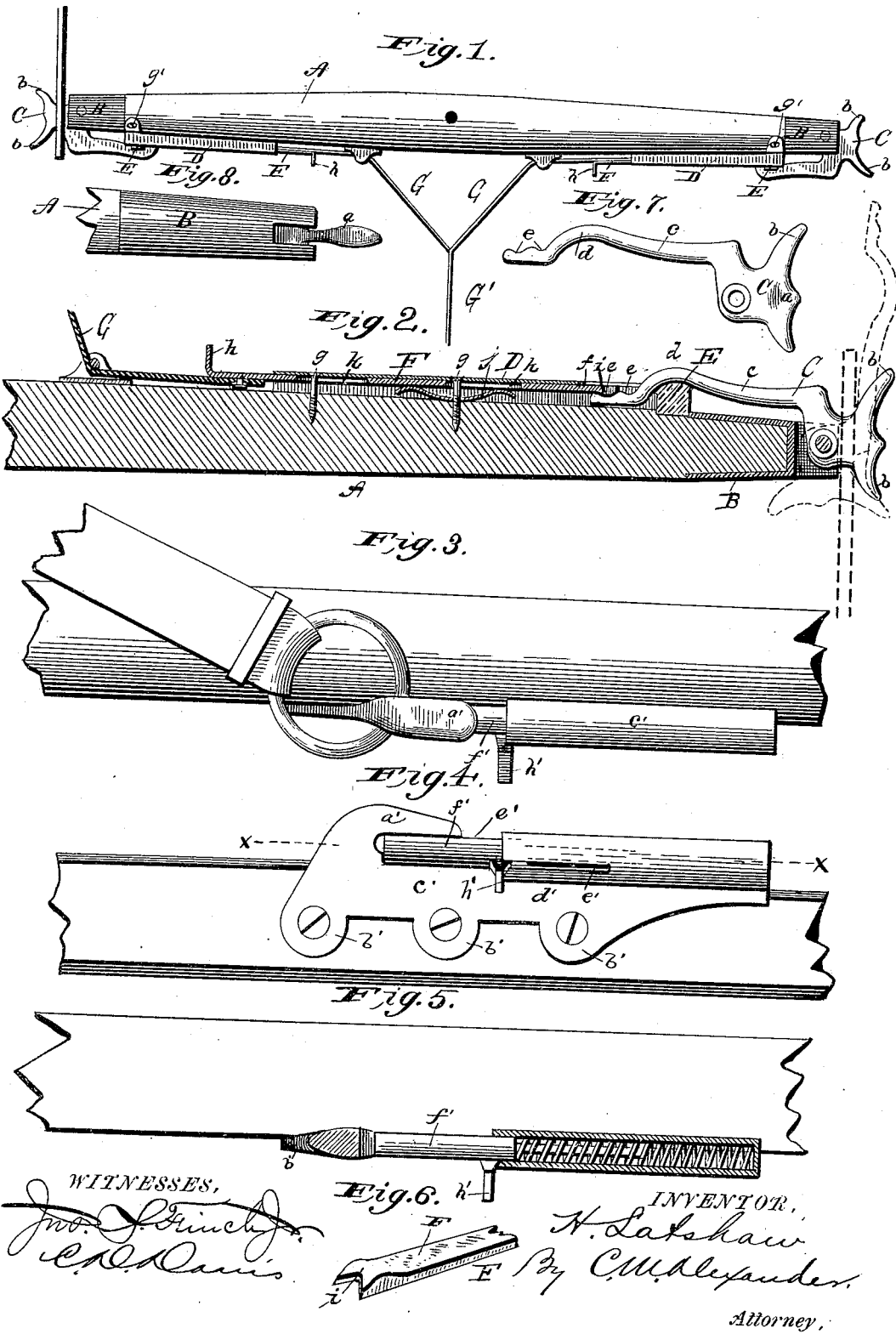

UNITED STATES PATENT OFFICE.

HEZEKIAH LATSHAW, OF BATAVIA, NEW YORK.

HORSE-DETACHER.

SPECIFICATION forming part of Letters Patent No. 397,733, dated February 12, 1889.

Application filed October 11, 1888. Serial No. 287,797. (No model.)

*To all whom it may concern:*

Be it known that I, HEZEKIAH LATSHAW, a citizen of the United States, residing at Batavia, in the county of Genesee and State of New York, have invented certain new and useful Improvements in Horse-Detachers, of which the following is a specification, reference being had therein to the accompanying drawings.

My invention has relation to that class of horse-detaching devices wherein the traces are detached from the hooks on the ends of the singletree by means of a strap or cord running back to within convenient reach of the driver or other occupants of the vehicle, thus providing for the ready detachment of an unruly animal at a moment's notice, as will be more fully hereinafter set forth.

The invention has also for its object to provide a simple and automatic holdback that may be attached to the thills or shafts of a vehicle, and which will automatically release the holdback-ring whenever the traces are released, as will presently appear.

The invention will be fully understood and appreciated from the annexed drawings when taken in connection with the following specification.

Referring to the drawings annexed, Figure 1 represents a plan view of a singletree provided with my improved detaching devices; Fig. 2, a horizontal sectional view through one end of the singletree; Fig. 3, a side elevation of a portion of one of the thills provided with my improved holdback; Fig. 4, a bottom view of the same; Fig. 5, a longitudinal sectional view taken on the line $x\ x$ of Fig. 4; Fig. 6, a detail perspective view of the forward end of the locking-slide; Fig. 7, a detail plan view of the trace-hook lever; and Fig. 8, a front view of the same.

Referring to the drawings by letter, A designates the singletree, provided with the metallic ferrules or caps B B on its ends. In horizontal slots in the ends of these ferrules are pivoted the automatically-releasing trace-hooks C. Each trace-hook C is provided with the enlarged and rounded head $a$ to prevent the premature detachment of the trace, and the oppositely-projecting outwardly-curved horns or projections $b\ b$, the forward one of which assists in opening the slot in the end of the trace to permit the same to readily slip off in detaching, and the rear one assists in preventing the trace from slipping off accidentally. These curved horns also assist or facilitate the insertion of the hook in the eye or slot in the end of the trace in hitching up. Formed on the rear side of the hook is an arm, $c$, directed inwardly and curved at $d$ and provided on its end with one or more rounded notches, $e$. Secured on the rear side of the singletree in any suitable manner are the metallic casings or boxes D, which are open at their ends and longitudinally slotted at their outer ends, as at $f$. Each box is secured to the singletree by the screws $g\ g$ and the ears and screws $g'$, as shown. As shown in Fig. 2, the notched ends of arms $c$ of the trace-hooks are adapted to enter the slots $f\ f$ of the casings, and under the curved portions $d$ of these arms are placed elastic blocks or springs E, which are clamped and held between the outer ends of the sides of the casings.

The letter F designates a sliding locking-bar working within the open-ended casing D and provided with a thumb-piece, $h$, at its inner end and a notched and rounded head or enlargement, $i$, on its outer end, this notched and headed end being adapted to engage the notched end of the trace-hook arms, as shown in Fig. 2. This bar is kept pressed normally against the rear side of the casing D by means of a spring, $j$, and is guided and limited in its movements by means of the aforesaid screws $g$, which pass through longitudinal slots $k$ in the bar. One of these securing-screws also serves to hold the spring $j$ in place. These locking-bars F are drawn inwardly by means of the straps G, attached to their inner ends and extending to within easy reach of the occupants of the vehicle, and are forced outwardly into engagement with the inner notched ends of the arms $c$ by means of the thumb-pieces $h$.

When it is desired to release or throw the traces (one of which is shown in dotted lines in Fig. 2) off the hooks C, all that is necessary for the occupants of the vehicle to do is to pull simultaneously on the straps G G, (which may be connected to one main strap, G'.) This will disengage the heads $i$ of the locking-bars F from the inner notched ends of the arms $c$ and release the trace-hooks. The instant the trace-hooks are released the draft on the same and the pressure of the elastic blocks on the arms c will instantly throw the hooks around to the position shown in dotted lines in Fig. 2 and permit the traces to readily slip off.

In order to automatically detach the holdback straps from the shafts or thills when the traces are released, I attach the device shown in Figs. 3, 4, and 5 to the inner lower edges of the thills. The holdback consists of the forwardly-projecting hook $a'$, the perforated securing-ears $b'$, and the horizontal cylinder or barrel $c'$, all formed integral with a main plate, $d'$. The forward end of the cylinder is open and terminates a short distance forward of the end of the hook $a'$, leaving a narrow throat or passage, $e'$, and the rear end of the cylinder is closed. Adapted to reciprocate within this cylinder is a spring-actuated bolt, $f'$, provided with a thumb-piece, $h'$, which latter works in a slot in the under side of the cylinder. This bolt by its spring is kept pressed normally forward between the hook $a'$ and the main plate $d'$, and is adapted to hold the holdback-ring in place and prevent rattling of the same. By this construction of holdback it will be observed that when the traces are released and the horse moves forward the holdback-ring will press the bolt $f'$ back in its cylinder and allow the ring to slip out through the throat or passage $e'$, thus completely disengaging or detaching the animal from the vehicle.

These devices are very simple and inexpensive in construction and positive and reliable in operation, as will be observed, and will prevent or obviate disastrous and painful accidents due to frightened and unruly animals.

Having thus fully described my invention, what I claim as new, and desire to secure by Letters Patent, is—

1. The combination of a singletree, the trace-hooks pivoted to the ends thereof and provided with the inwardly-extending arms, these arms being provided with curved notches on their inner ends, casings secured to the singletree, the sliding locking-bars, these bars being kept pressed normally against the top of the said casing by means of an inclosed spring, and the operating-straps, substantially as described.

2. The combination of the singletree, trace-hooks C, pivoted in the ends thereof and constructed as described, the slotted casings, the elastic blocks E, the slotted sliding locking-bar, and the spring $j$, substantially as described.

3. A holdback consisting of the following parts: a main plate, a forwardly-extending hook, $a'$, formed integral with the main plate and extending parallel therewith, a slotted cylinder formed integral with the main plate and terminating near the forward end of the hook $a'$, forming a throat, $e'$, and a spring-actuated bolt working in said cylinder and adapted to close the said throat $e'$, substantially as described.

In testimony whereof I affix my signature in presence of two witnesses.

HEZEKIAH LATSHAW.

Witnesses:
L. C. McINTYRE,
J. L. BIGELOW.